No. 881,584. PATENTED MAR. 10, 1908.
R. J. HOFFMAN.
CYLINDER OR TUBE.
APPLICATION FILED MAY 10, 1907.

Attest:
Ewd L. Tolson
Edward W. Sarton

Inventor
Ross J. Hoffman
By Spear, Middleton, Donaldson & Spear
Attys.

UNITED STATES PATENT OFFICE.

ROSS J. HOFFMAN, OF BRADFORD, PENNSYLVANIA.

CYLINDER OR TUBE.

No. 881,584.     Specification of Letters Patent.     Patented March 10, 1908.

Application filed May 10, 1907. Serial No. 372,928.

*To all whom it may concern:*

Be it known that I, Ross J. Hoffman, citizen of the United States, residing at Bradford, Pennsylvania, have invented certain new and useful Improvements in Cylinders or Tubes, of which the following is a specification.

My invention relates to cylinders for pumping heads for oil wells, and for other purposes.

In the pump now in use for oil wells, the agent through which power is applied to the pump, is air, by means of which several pumps, in wells more or less remote from each other, may be operated from a central source of power. This agent requires a large cylinder, which, as heretofore made is expensive, these cylinders being cast and subsequently lined, to give proper surface for the piston.

My invention herein described, is designed for the purpose of avoiding this expense, and I find that by my construction a perfect and durable cylinder can be easily and cheaply produced.

Figure 1:
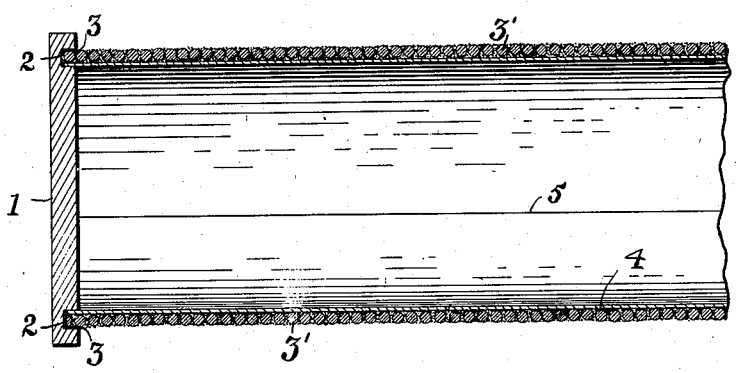
Figure 2:
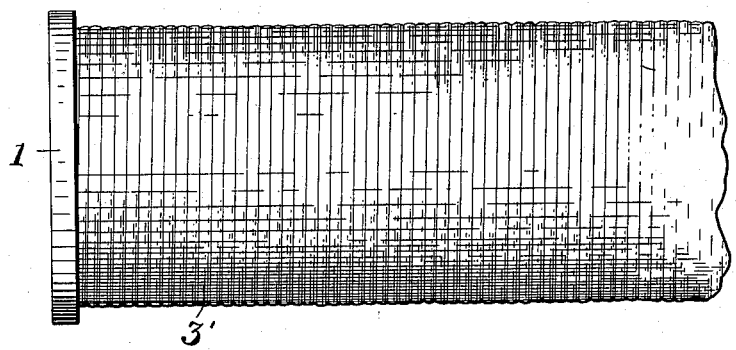
Figure 3:
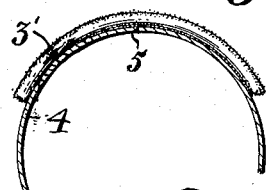

In the accompanying drawings Figure 1 represents a central longitudinal section of a cylinder made according to my invention, and Fig. 2 is a side elevation of a tubing made according to my invention. Fig. 3 is a detail sectional view of part of the cylinder or tube taken transversely thereof.

In carrying out my invention, I provide a mandrel, of proper length, and of a diameter exactly equal to the required interior diameter of the cylinder to be made. Upon this I wrap a sheet of metal, preferably brass, and which may be very thin. This sheet is cut to dimensions required, so as to fit closely at all points, and to bring together the abutting edges, on the mandrel. Upon the sheet metal so applied, I closely coil suitable wire, with the folds thereof contiguous, and extending from end to end, so as to form a continuous layer of wire over the sheet metal. As the wrapping proceeds I apply solder to the wire which solder is sweated into the crevice between the coils and into the spaces between the wire and the sheet metal, thus forming a solid combined shell. This solder holds the wire in exactly the same position in which it is wound and prevents the same from loosening or unwinding as the process is performed. The wires are bound together by this solder and form therewith, practically an integral outer layer or shell lined with the thin sheet metal plate, of cylindrical form, which may be for instance of very thin material, say $\frac{1}{32}$ or $\frac{1}{64}$ of an inch in thickness. I prefer to apply the solder to the whole surface of the wire and to sweat it into the crevices between the same and into the crevices or grooves at the interior of the layer of wire so that the solder will be applied to the exterior surface of the sheet metal to bind the sheet metal and the wire together.

An important result follows from the use of the solder in that it solders the joint where the edges of the sheet metal are brought together and thus provides a sheet metal cylinder which would be maintained in its cylindrical form by the soldered joint alone but which in addition to this is sustained and strengthened over its whole surface by the winding of the wire.

The article as produced by me is particularly adapted for use as cylinders for pumping engines such as the pumping head of oil wells, the brass lining providing a wearing surface for the piston to work upon.

By my invention a cylinder may be formed having an accurate bore throughout, as it is only necessary to apply the sheet metal closely to the accurately formed mandrel in order to assure accuracy in the diameter of the cylinder, the wire and the solder serving to maintain the sheet metal cylinder or interior lining in exactly the shape of the mandrel.

While I prefer to apply the solder throughout the whole extent of the tubing in order to unite the coils of wire to each other and to the inner sheet metal shell, I may apply the solder only to the portion of the wire which overlies the joint of the sheet metal lining. When so applied the solder performs the two-fold function of uniting the wire strands or coils together and to the sheet metal lining, and also serves to solder the joint between the abutting edges of the said sheet metal.

The tubing, formed as above described, when used for a cylinder, is provided with cylinder heads as shown at 1, having grooves 2 to receive the ends of the tube, the said grooves having therein suitable packing material 3. The walls of these grooves serve to confine the wire wound ends of the tubing and aid in holding the wire in place at the ends of the tubing. This effect simply augments, however, the holding effect of the solder and is not depended upon solely to hold the wire in place at its ends. The wire wound upon the sheet metal is indicated at 3', the sheet metal at 4, and the joint between the abutting edges at 5.

It will be understood that in carrying out my process I prefer to apply the solder to the windings of wire as the same is laid upon the sheet metal shell so as to prevent unwrapping and to maintain the wire in precisely the position in relation to the sheet metal shell in which it is laid.

I claim as my invention:—

1. A cylinder or tubing composed of an inner shell of sheet metal rolled into cylindrical form with its edges abutting, an outer winding of wire and solder filling the interstices between the windings of the wire and between said wire and the sheet metal, said solder uniting the abutting edges of the sheet metal together, substantially as described.

2. In combination, a cylinder composed of an inner lining of sheet metal rolled into cylindrical form with its edges abutting, an outer winding of wire soldered thereto and the heads having grooves to receive the ends of the sheet metal cylinder and the wire winding, substantially as described.

In testimony whereof, I affix my signature in presence of two witnesses.

ROSS J. HOFFMAN.

Witnesses:
E. J. JONES,
KATHARINE BURKE.